US006654739B1

(12) United States Patent
Apte et al.

(10) Patent No.: US 6,654,739 B1
(45) Date of Patent: Nov. 25, 2003

(54) LIGHTWEIGHT DOCUMENT CLUSTERING

(75) Inventors: Chidanand Apte, Chappaqua, NY (US); Sholom M. Weiss, Highland Park, NJ (US); Brian F. White, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/494,744

(22) Filed: Jan. 31, 2000

(51) Int. Cl.[7] .............................................. G06F 17/30
(52) U.S. Cl. ............................ 707/5; 707/200; 707/205
(58) Field of Search ................................. 707/1, 200, 2, 707/205, 3, 4, 5, 100, 101, 103, 102, 500, 501, 502

(56) References Cited

U.S. PATENT DOCUMENTS

| | | | | |
|---|---|---|---|---|
| 5,819,258 A | * | 10/1998 | Vaithyanthan et al. | 707/2 |
| 5,857,179 A | * | 1/1999 | Vaithyanathan et al. | 707/2 |
| 5,924,105 A | * | 7/1999 | Punch et al. | 707/513 |
| 5,926,812 A | * | 7/1999 | Hilsenrath et al. | 707/5 |
| 6,038,574 A | * | 3/2000 | Pitkow et al. | 707/102 |
| 6,119,124 A | * | 9/2000 | Broder et al. | 707/103 |
| 6,167,397 A | * | 12/2000 | Jacobson et al. | 707/5 |
| 6,189,002 B1 | * | 2/2001 | Roitblat | 707/1 |

FOREIGN PATENT DOCUMENTS

EP 0 859 330 A1 8/1998

OTHER PUBLICATIONS

European Search Report dated Dec. 3, 2001.

* cited by examiner

*Primary Examiner*—Shahid Al Alam
*Assistant Examiner*—Isaac Woo
(74) *Attorney, Agent, or Firm*—Whitham, Curtis & Christofferson, P.C.; Stephen C. Kaufman

(57) ABSTRACT

A procedure for clustering documents that operates in high dimensions, processes tens of thousands of documents and groups them into several thousand clusters or, by varying a single parameter, into a few dozen clusters. The procedure is specified in two parts: computing a similarity score representing the k most similar documents (typically the top ten) for each document in the collection, and grouping the documents into clusters using the similarly scores.

7 Claims, 2 Drawing Sheets

LIGHTWEIGHT DOCUMENT CLUSTERING

BACKGROUND OF THE INVENTION

1. Field of the Invention

The present invention generally relates to information retrieval using text mining and, more particularly, to a lightweight document clustering method that operates in high dimensions, processes tens of thousands of documents and groups them into several thousand clusters or, by varying a single parameter, into a few dozen clusters.

2. Background Description

The objective of document clustering is to group similar documents together, assigning them to the same implicit topic. Document clustering was originally of interest because of its ability to improve the effectiveness of information retrieval. Standard information retrieval techniques, such as nearest neighbor methods using cosine distance, can be very efficient when combined with an inverted list of word to document mappings. These same techniques for information retrieval perform a variant of dynamic clustering, matching a query or a full document to their most similar neighbors in the document database. Thus, standard information retrieval techniques are efficient and dynamically find similarity among documents, reducing the value for information retrieval purposes of finding static clusters of large numbers of similar documents. See, for example, Chapter 6, "Techniques", pp. 305–312, *Readings in Information Retrieval*, K. Sparck-Jones and P. Willet, editors, Morgan Kaufmann, 1997.

The advent of the web has renewed interest in clustering documents in the context of information retrieval. Instead of pre-clustering all documents in a database, the results of a query search can be clustered, with documents appearing in multiple clusters. Instead of presenting a user with a linear list of related documents, the documents can be grouped in a small number of clusters, perhaps ten, and the user has an overview of different documents that have been found in the search and their relationship within similar groups of documents. One approach to this type of visualization and presentation is described in O. Zamir, O. Etzioni, O. Madani, and R. Karp, "Fast and Intuitive Clustering of Web Documents", *Proceedings of the 3rd International Conference on Knowledge Discovery and Data Mining*, Morgan Kaufman, 1997. Here again though, the direct retrieval and linear list remains effective, especially when the user is given a "more like this" option that finds a subgroup of documents representing the cluster of interest to the user.

Document clustering can be of great value for tasks other than immediate information retrieval. Among these task are summarization and label assignment, or dimension reduction and duplication elimination.

These concepts can be illustrated by way of a help-desk example, where users submit problems or queries online to the vendor of a product. Each submission can be considered a document. By clustering the documents, the vendor can obtain an overview of the types of problems the customers are having. For example, a computer vendor might discover that printer problems comprise a large percentage of customer complaints. If the clusters form natural problem types, they may be assigned labels or topics. New user problems may then be assigned a label and sent to the problem queue for appropriate response. Any number of methods can be used for document categorization once the appropriate clusters have been identified. Typically, the number of clusters or categories number no more than a few hundred and often less than a hundred.

Not all users of a product report unique problems to the help-desk. It can be expected that most problem reports are repeat problems, with many users experiencing the same difficulty. Given enough users who report the same problem, a FAQ (Frequently Asked Questions) report, may be created. To reduce by reducing the number of documents in the database of problem reports, redundancies in the documents must be detected. Unlike the summary of problem types, many problems will be similar but still have distinctions that are critical. Thus, while the number of clusters needed to eliminate duplication of problem reports can be expected to be much smaller than the total number of problems reports, the number of clusters is necessarily relatively large, much larger than needed for summarization of problem types.

The classical k-means technique described by J. Hartigan and M. Wong in "A k-Means Clustering Algorithm", *Applied Statistics*, 1979, can be applied to document clustering. Its weaknesses are well known. The number of clusters k must be specified prior to application. The summary statistic is a mean of the values for each cluster. The individual members of the cluster can have a high variance and the mean may not be a good summary of the nearest neighbors that are typically found in a search procedure. As the number of clusters grow, for example to thousands of clusters, k-means clustering becomes untenable, approaching the $O(n^2)$ comparisons where n is the number of documents.

More recent attention has been given to hierarchical agglomerative methods as described by A. Griffiths, H. Luckhurst and P. Willet in "Using Interdocument Similarity Information in Document Retrieval Systems", *Readings in Information Retrieval*, pp. 365–373, K. Sparck-Jones and P. Willet, editors, Morgan Kaufmann, 1997. The documents are recursively merged bottom up, yielding a decision tree of recursively partitioned clusters. The distance measures used to find similarity vary from single-link to more computationally expensive ones, but they are closely tied to nearest-neighbor distance. The algorithm works by recursively merging the single best pair of documents or clusters, making the computational costs prohibitive for document collections numbering in the tens of thousands.

To cluster very large numbers of documents, possibly with a large number of clusters, some compromises must be made to reduce dimensions of the number of indexed words and the number of expected comparisons. In B. Larsen and C. Aone, "Fast and Effective Text Mining Using Linear-time Document Clustering", *Proceedings of the 5th International Conference on Knowledge Discovery and Data Mining*, pp. 16–22, ACM, 1999, indexing of each document is reduced to the twenty-five highest scoring TF-IDF (term frequency and inverse document frequency) words (see G. Salton and C. Buckley, "Term-Weighting Approaches in Automatic Text Retrieval", *Readings in Information Retrieval*, pp. 323–328, K. Sparck-Jones and P. Willet, editors, Morgan Kaufinann, 1997), and then k-means is applied recursively, for k=9. While efficient, this approach has the classical weaknesses associated with k-means document clustering. A hierarchical technique that also works in steps with a small, fixed number of clusters is described in D. Cutting, D. Karger, J. Pedersen, and J. Tukey, "Scatter/Gather: a Cluster-based Approach to Browsing Large Document Collections, *Proceedings of the 15th ACM SIGIR*, 1992.

SUMMARY OF THE INVENTION

It is therefore an object of the present invention to provide a lightweight document clustering method that operates in high dimensions, processes tens of thousands of documents and groups them into several thousand clusters.

It is another object of the invention to provide a document clustering method of the type described wherein by varying a single parameter, the documents can be grouped into a few dozen clusters.

According to the invention, the method uses a reduced indexing view of the original documents, where only the k best keywords of each document are indexed. An efficient procedure for clustering is specified in two parts: (a) compute k most similar documents for each document-in the collection, and (b) group the documents into clusters using these similarity scores. The method is intended to operate in high dimensions with tens of thousands of documents and is capable of clustering a database into the moderate number of clusters need for summarization and label assignment or the very large number of clusters needed for the elimination of duplication. The method has been evaluated on a database of over 50,000 customer service problem reports that are reduced to 3,000 clusters and 5,000 exemplar documents. Results demonstrate efficient clustering performance with excellent group similarity measures.

The lightweight procedure of the present invention operates efficiently in high dimensions and is effective in directly producing clusters that have objective similarity. Unlike k-means clustering, the number of clusters is dynamically determined, and similarity is based on nearest-neighbor distance, not mean feature distance. The document clustering method of the present invention thus maintains the key advantage of hierarchical clustering techniques, their compatibility with information retrieval methods, and maintains performance for large numbers of documents.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Data Preparation

Figure 1:
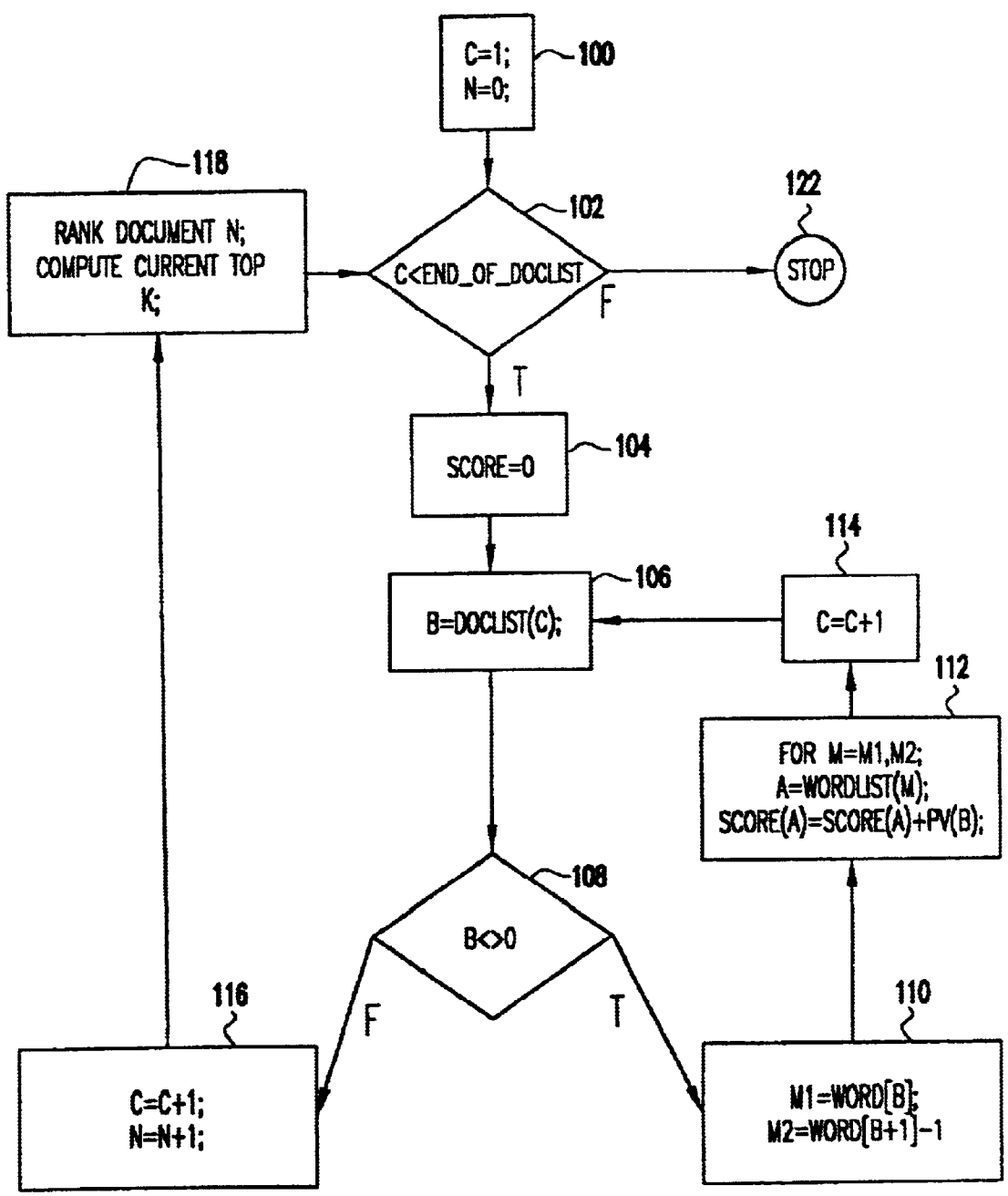
FIG. 1 is a flow diagram of the top-k scoring algorithm implemented by the invention.

The clustering algorithm of the present invention processes documents in a transformed state, where the documents are represented as a collection of terms or words. A vector representation is used. In the simplest format, each element of the vector is the presence or absence of a word. The same vector format is used for each document; the vector is a space taken over the complete set of words in all documents. Clearly, a single document has a sparse vector over the set of all words. Some processing may take place to stem words to their essential root and to transform the presence or absence of a word to a score, such as TF-TDF, that is a predictive distance measure. In addition, weakly predictive words (i.e., stop words) are removed. These same processes can be used to reduce indexing further by measuring for a document vector only the top k-words in a document and setting all remaining vector entries to zero.

An alternative approach to selecting a subset of features for a document, described in S. M. Weiss, B. F. White, C. Apte and F. Damerau, "Lightweight Document Matching", *Prodeedings of the IJCAI-99 Workshop on Text Mining: Foundations, Applications, and Techniques,* 1999, assumes that documents are carefully composed and have effective titles. Title words are always indexed along with the k most frequent words in the document and any human-assigned key words.

Not all words are of the same predictive value and many approaches have been tried to select a subset of words that are most predictive. The main concept is to reduce the number of overall words that are considered, which reduces the representational and computational tasks of the clustering algorithm. Reduced indexing can be effective in these goals when performed prior to clustering. The clustering algorithm accepts as input the transformed data, much like any information retrieval system, and works with a vector representation that is a transformation of the original documents.

Clustering Methods

The method of the present invention uses a reduced indexing view of the original documents, where only the k best keywords of each document are indexed. This reduces the vector size of a document, as well as the computation time for distance measures for a clustering method. The procedure for clustering is specified in two parts: (a) compute k most similar documents (typically the top ten) for each document in the collection, and (b) group the documents into clusters using the similarly scores. To be fully efficient, both procedures must be computationally efficient. Finding and scoring the k most similar documents for each document will be specified as a mathematical algorithm that processes fixed integer vectors. The procedure is simple, comprising a repetitive series of loops that accesses a fixed portion of memory leading to efficient computation. The second procedure uses the scores for the k most similar documents into clustering the document. Unlike the other algorithms described earlier herein, the second clustering step does not perform a "best-match first-out" merging, but instead merges documents and clusters based on a "first-in first-out" basis.

Figure 2:
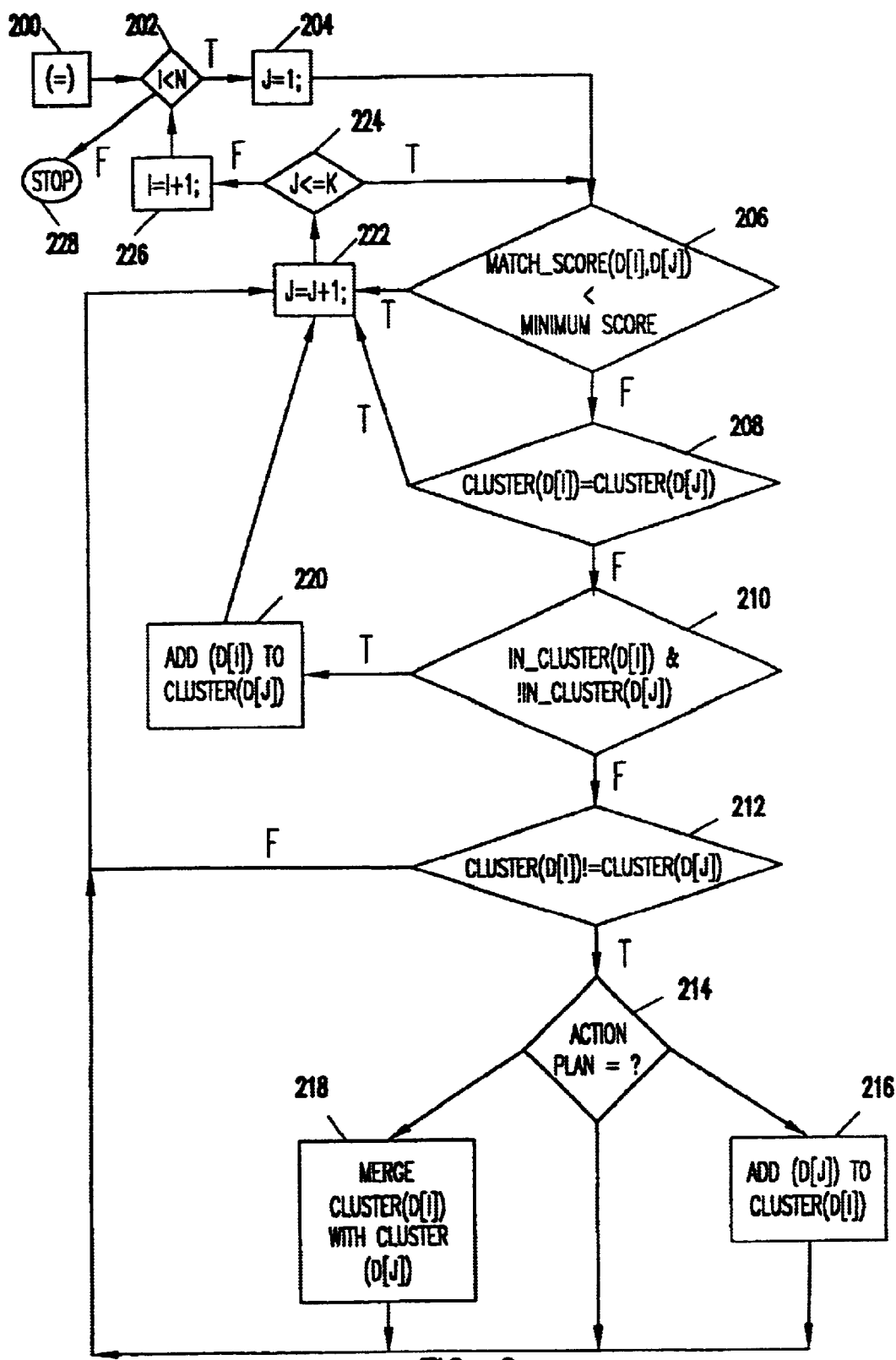
FIG. 2 is a flow diagram of the cluster formation algorithm implemented by the invention.

Referring now to the drawings, FIG. 1 describes the algorithm for computing the top-k matches for all documents, and FIG. 2 is the clustering algorithm. Similarity or distance is measured by a simple additive count of words found in both documents that are compared plus their inverse document frequency. This differs from the standard TF-IDF formula in that term frequency is measured in binary terms ( i.e., "0" or "1") for presence or absence, respectively. In addition the values are not normalized; just the sum is used TF-IDF has slightly stronger predictive value, but the simpler function has numerous advantages in terms of interpretability, simple additive computation, and elimination of storage of term frequencies. The algorithm can readily be modified to use TF-IDF scoring.

The following are definitions for the top-k scoring algorithm implemented by the flow diagram of FIG. 1:

doclist: The words (terms) in each document. A vector of numbers; documents are separated by zeros.

Example: Sequence=10 44 98 0 24 . . . The first document has words 10, 44 and 98. The second document has word 24 . . .

wordlist: The documents in which a word is found. A series of numbers.

word(c): The start of the documents for word j. To process all documents for word c, access word(c) through word(c+1)−1.

Example: word(1)=1, word(2)=4. Wordlist=18 22 64 16 . . . word 1 appears in documents 18, 22, 64 pv(c): predictive values of word c=1+idf, where idf is 1/(number of documents where word c appears)

match score: The number of times a document appears in the word list

FIG. 1 describes the computation of the k most similar documents, typically the top ten, for each document in the collection. Conceptually, the following steps are shown in FIG. 1:

1. Get the words of the next document (from doclist), and set all document scores to zero.

2. Get the next word, w, for the current document. If no words remain, store the k documents with the highest scores and continue with step 1.

3.For all documents having word w (from wordlist), add to their scores and continue with step 2.

Referring to FIG. 1, in step 100, the word c is initialized to 1,and the number of documents n is initialized to 0. In decision block 102, a test is made to determine whether all of the words in the document list have been processed. If yes, the process terminates, as shown in step 122. If no, the score is initialized to 0, as shown in step 104. In step 106, the $c^{th}$ word in the document list is assigned to a parameter value. In step 106, the parameter is b. However, it should be readily apparent to those skilled in the art that other parameters may be substituted for b, or any other parameter used in FIGS. 1 and 2. In step 108, a test is conducted to see if a new document if being processed. Recall that, in this particular embodiment, a "0" value signifies the end of the document. Thus, if b <>0,words from the same document continue to be processed, as shown in steps 110, 112 and 114. Likewise, if b=0, a new document is processed, as shown in step 116 and 118.

Thus, if the test is decision block 108 yields that b <>0 (i.e., words within the same document are being processed), the steps 110, 112 and 114 are executed. Specifically, in step 100 the algorithm transition to the word list, where the first (m1) and last (m2) documents associated with the current word in the document list are delineated. In step 112, a score for each document associated with the current word in the document list is computed. In step 114, the word count is incremented, so that the next word in the document list is accessed in step 106. In step 118, the document n that is most recently processed is ranked, and its top k matched documents are stored.

If the test in decision block 108 yields that b=0, then the word count j and document count n are incremented in step 116, and the top k documents are computed in step 118.

FIG. 2 describes the algorithm that forms the clusters. With regard to FIG. 2:

N is the number of documents;

D[i] is the $i^{th}$ document;

Cluster(D[i]) is the cluster of document D[i], and $In_{13}$ Custer(D[i]) indicates that the $i^{th}$ document has been clustered.

Documents are examined in a pairwise fashion proceeding with the first document and its top-k matches. Matches below a pre-set minimum score threshold are ignored. Clusters are formed by the document pairs not yet in clusters, and are merged when the matched pair appear in separate clusters. If merging is not allowed, a very large number of strong clusters (i.e., a high number of overlapping words between clusters) is formed. Note that strong clusters tend to occur when smaller dictionary sizes are used. The single setting of the minimum score has a strong effect on the number of clusters, a high value produces a relatively large number of clusters and a zero value produces a relatively small number of clusters. Similarly, a high minimum score may leave some documents unclustered, while a low value clusters all documents.

The remaining task is to group the documents into clusters using these similarly scores, as described in FIG. 2. It is a single pass algorithm, with at most k x n comparisons of similarity, where n is the number of documents. Conceptually, the following steps are shown in FIG. 2.

1. Iterate through all documents D[i]
2. For each match pair for a document D[i], D[j]
   a. If the score is less than a threshold minimum score, go to the next pair;
   b. If the pair is already in the same cluster, go to the next pair;
   c. If D[i] and D[j] are in separate clusters, add D[j] to the cluster that D[i] is in, go to the next pair;
   d. Cluster Merge Step. If D[i] and D[j] are is separate clusters:
      i. If option is "no merging", go to the next pair;
      ii. If option is "repeat documents", replicate D[j] in all clusters D[i] is in, and go to the next pair;
      iii. Otherwise, merge the two separate clusters into one cluster, and go to the next pair.

The remaining task is to group the documents into clusters using these similarly scores, as described in FIG. 2. Conceptually, the following steps are shown in FIG. 2.

In step 200, parameter i, corresponding to document D[i], is selected. In decision block 202, a test is made to determine whether the current document is the last document in the document list N. If the document i is the last document in the document list N, then the algorithm stops, as shown in step 228. If document i is not the last document, then a parameter, j, corresponding to a second document is initialized to 1, as shown in step 204.

In step 206, a test is made to see if the match score is less than a threshold minimum score. If yes, the algorithm moves on to the next pair of documents, as indicated in steps 222, 224 and 226.

If no, in step 208 a test is made to determine if the document pair (D[i], D[j]) is already in the same cluster. If yes, the algorithm moves on to the next pair of documents, as indicated in steps 222, 224 and 226.

If no, a test is made is decision block 210 to determine if one document (D[i]) is in a cluster and the other document (D[j]) is not. If (D[i]) and (D[j]) are not in the same cluster, the algorithm adds D[j] to cluster D[i], as shown in step 20, and moves on to the next pair of documents, as shown in steps 222, 224 and 226. If (D[i]) and (D[j]) are in the same cluster, a determination is made in decision block 214 as to what action plan will be pursued. In the present invention, the user determines what action plan to take by parameterized invocation of the clustering. If the option is to merge the documents, as shown in step 218, the two separate clusters are merged into one cluster, as shown in step 218, and the algorithm moves on to the next pair of documents, as indicated in steps 222, 224 and 226. If the option is "no merging" 215, the algorithm moves on to the next pair of documents, as indicated in steps 222, 224 and 226. If the option is to repeat documents (i.e., duplicate in more than one cluster), as shown in step 216, document D[j] is replicated in all clusters D[i] is in, and the algorithm moves on to the next pair of documents, as indicated in steps 222, 224 and 226.

Measures for Evaluation of Clustering Results

How can we objectively evaluate clustering performance? Very often, the objective measure is related to the clustering technique. For example, k-means clustering can measure overall distance from the mean. Techniques that are based on nearest neighbor distance, such as most information retrieval techniques, can measure distance from the nearest neighbor or the average distance from other cluster members.

For the clustering algorithm of the present invention, distance is measured mostly in terms of counts of words present in documents. A natural measure of cluster performance is the average number of indexed words per cluster; i.e., the local dictionary size. The average is computed by weighing the number of documents in the cluster as in equation (1), where n is the total number of documents, m is the number of clusters, $Size_k$ is the number of documents in the k-th cluster, and $LDict_k$ is the number of indexed words in the k-th cluster.

$$AverageDictionarySize = \sum_{k=1}^{m} \frac{Size_k}{n} \cdot LDict_k \quad (1)$$

Results of clustering are compared to documents randomly assigned to the same size clusters. Clearly, the average dictionary size for computed clusters should be much smaller than those for randomly assigned clusters of the same number of documents.

Summarizing Clustering Results

The same measure of evaluation can be used to find exemplar documents for a cluster. The local dictionary of a document cluster can be used as a virtual document that is matched to the members of the cluster. The top-k matched documents can be considered a ranked list of exemplar documents for the cluster.

Selecting exemplar documents from a cluster is a form of summary of the cluster. The technique for selecting the exemplars is based on matching the cluster's dictionary of words to its constituent documents. The words themselves can provide another mode of summary for a cluster. The highest frequency words in the local dictionary of a cluster often can distinguish a cluster from others. If only a few words are extracted, they may be considered a label for the cluster.

Special Scoring

Scoring of document matches has been described in term of an additive function, mostly dependent on the number of matched words for a pair of documents. In some applications, such as help-desk documents, special tags in a document can convey important information about its related documents. For example, a product model number might be considered a special characteristic that is particularly important for finding similar documents. Words can be assigned special tags, whereby they are given extra weight or more importantly, their absence can lead to a subtraction from the score. For example, when two documents have different model numbers, we can subtract one from the candidate matching document. This additive scheme for special tags is consistent with the general scheme of measuring similarity, yet provides a mechanism for handling exceptional matches of words.

Results

To evaluate the performance of the clustering algorithms, 51,110 documents were obtained, taken from reports from customers having IBM AS/400 computer systems. These documents were constructed in real-time by customer service representatives who record their phone dialog with customers encountering problems with their systems.

The documents were indexed with a total of 21,682 words in a global dictionary composed over all documents. Table 1 summarizes the results for clustering the document collection in terms of the number of clusters, the average cluster size, the ratio of the local dictionary size to random assignment, the percentage of unclustered documents, the minimum score for matching document pairs, and whether merging was used. The first row in the table indicates that 49 clusters were found with an average size of 1027 documents. A random cluster's dictionary was on average 1.4 times larger than the generated cluster; and 1.5% of the documents were not clustered. These results were obtained by using a minimum score of 1 and cluster merging was allowed. All results are for finding the top-10 document matches.

TABLE 1

Results for Clustering Help-Desk Problems

| Cnum | Ave Size | Rnd Ratio | Unclust % | Min Score | Merge |
|------|----------|-----------|-----------|-----------|-------|
| 49   | 1027.3   | 1.4       | 1.5       | 1         | yes   |
| 86   | 579.6    | 1.4       | 2.5       | 2         | yes   |
| 410  | 105.5    | 1.5       | 16.2      | 3         | yes   |
| 3250 | 15.5     | 1.8       | 1.5       | 1         | no    |
| 3346 | 14.9     | 1.8       | 2.5       | 2         | no    |
| 3789 | 11.4     | 1.9       | 16.2      | 3         | no    |

A single clustering run, one row in Table 1 currently takes 15 minutes on a 375 MHz IBM RS6000 workstation running AIX (IBM's version of the UNIX operating system). The code is written in the Java programming language. Exemplar documents were selected for each of the 3250 clusters found in the fourth entry of the table. For some large clusters, two or three exemplars were selected for a total of 5,000 exemplar documents. Using the same scoring scheme, each of the exemplars was matched to the original 51,110 documents. 98.4% of the documents matched at least one of the exemplars, having at least one indexed word in common. 60.7% of the documents matched an exemplar of their assigned cluster, rather than an exemplar of an alternative cluster.

Conclusion

The lightweight document clustering algorithms described herein is efficient in high dimensions, both for large document collections and for large numbers of clusters. No compromises are made to partition the clustering process into smaller sub-problems. All documents are clustered in one stage.

These clustering algorithms have many desirable properties. Unlike k-means clustering, the number of clusters is dynamically assigned. A single parameter, the minimum score threshold, effectively controls whether a large number of clusters or a much smaller number is chosen. By disallowing merging of clusters, a very large number of clusters can be obtained. The success of clustering can be measured in terms of an objective function. Here, the local dictionary size of the cluster is used. In all instances, we see that clustering is far better than random assignment. As expected, the greater the number of clusters, the better the performance when measured by dictionary size. In the help-desk application, it is important to remove duplication, but to still maintain a large number of exemplar documents. Here, it can be seen that dictionary size is nearly half the size of random document assignment.

Exemplar selection is secondary to the clustering process. In this application, special tags were used. The penalty for a mismatched tag is effective in the matching process, but tends to degrade performance in clustering. Dictionary size does not measure the effect of penalties. Still, excellent results have been achieved on matching exemplars to the original documents. The help-desk application is characterized by large number of specialized indexed words for computer systems. Future applications will determine the generality of this approach. There is ample room for enhancements to the computer implementation that will lead to faster performance and a capability to run on far larger document collections.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method for clustering similar documents together comprising the steps of:
   a) creating a document list containing for each document a linear list of a subset of keywords that appear in said each document;
   b) creating a wordlist that contains a linear list of all the documents that contain on their respective linear list of a subset of keywords a particular keyword;
   c) selecting a document in the document list;
   d) determining a specified number of documents that are most similar to the document selected in step c), wherein the similarity is based upon a summation of the total number of times that each keyword appears in the documents not selected in step c) plus a bonus, which is the inverse document frequency (IDF);
   e) repeating steps c) and d) for each document in the document list;
   f) arranging the specified documents determined in each iteration of step d) into a plurality of clusters wherein each document within a cluster has at least one same common keyword with all other documents in the cluster;
   j) assigning each document to a cluster; and
   k) determining a number of match pairs for a first document, wherein a number of match pairs is the number of second documents that are on the top k matched list for that document;
      for each match pair:
         i) if the match score is less than a threshold minimum score, proceed to the next match pair;
         ii) if the match pair is already in the same cluster, proceed to the next match pair;
         iii) if the first document is in a cluster, and the second document is not, add the second document to the cluster that the first document is in, and proceed to the next match pair;
         iv) if the first document and the second document are in separate clusters:
            if option is no merging, go to the next match pair;
            if option is repeat documents, replicate the second document in all clusters that the first document is in, and go to the next match pair; or
            merging the two separate clusters into one cluster, and go to the next match pair;
   l) repeating step k) for each document in the document list.

2. The method as recited in claim 1, wherein the determining step comprises the steps of:
   g) for each keyword in the document selected in step c), accessing the wordlist to calculate a match score for each document referenced therein, wherein the match score is a summation of the total number of times that each keyword appears plus a bonus, which is the IDF;
   h) ranking each document in the document list according to the respective match score of each document, and
   i) selecting a specified number of documents having the highest match score.

3. The method recited in claim 1, wherein said linear list of a subset of keywords for each document is comprised of the k most frequent words in the document.

4. The method recited in claim 1, wherein said linear list of a subset of keywords for each document is comprised of the k most predictive words in the document.

5. A computer program product comprising a computer usable medium having computer readable program code embodied in the medium for objectively grouping similar documents into clusters, the computer program product having:
   a) first computer program code for creating a document list containing for each document a linear list of a subset of keywords that appear in said each document;
   b) second computer program code creating a wordlist that contains a linear list of all the documents that contain on their respective linear list of a subset of keywords a particular keyword;
   c) third computer program code selecting a document in the document list;
   d) fourth computer program code determining a specified number of documents that are most similar to the document selected by the third computer program code, wherein the similarity is based upon a summation of the total number of times that each keyword appears in the documents not selected in step c) plus a bonus, which is the inverse document frequency (IDF);
   e) fifth computer program code for executing the third and fourth computer program code for each document in the document list;
   f) sixth computer program code arranging the specified documents determined in each execution of the fourth computer program code into a plurality of clusters wherein each document within a cluster has at least one same common keyword with all other documents in the cluster,
wherein the fourth computer program product comprises
   g) seventh computer program code that, for each keyword determined by the third computer program code, accesses the wordlist to calculate a match score for each document referenced therein, wherein the match score is a summation of the total number of times that each keyword appears plus a bonus, which is the IDF;
   h) eighth computer program code for ranking each document in the document list according to the respective match score of each document;
   i) ninth computer program code for selecting a specified number of documents having the highest match score;
wherein said sixth computer program product comprises:
   i) tenth computer program code for assigning each document to a cluster;

k) eleventh computer program code for determining a number of match pairs for a first document, wherein a number of match pairs is the number of second documents that are on the top k matched list for that document, such that for each match pair:
  i) if the match score is less than a threshold minimum score, proceed to the next match pair;
  ii) if the match pair is already in the same cluster, proceed to the next match pair;
  iii) if the first document is in a cluster, and the second document is not, add the second document to the cluster that the first document is in, and proceed to the next match pair;
  iv) if the first document and the second document are is separate clusters:
    if option is no merging, go to the next match pair;
    if option is repeat documents, replicate the second document in all clusters that the first document is in, and go to the next match pair; or
    merging the two separate clusters into one cluster, and go to the next match pair;
1) twelfth computer program code for re-executing the eleventh computer code for each document in the document list.

6. The computer program recited in claim 5, wherein said linear list of a subset of keywords for each document is comprised of the k most frequent words in the document.

7. The computer program recited in claim 5, wherein said linear list of a subset of keywords for each document is comprised of the k most predictive words in the document.

* * * * *